United States Patent
Hsu et al.

(10) Patent No.: US 9,879,715 B1
(45) Date of Patent: Jan. 30, 2018

(54) ROTATION SHAFT DEVICE

(71) Applicant: JARLLYTEC CO., LTD., New Taipei (TW)

(72) Inventors: Yu-Tsun Hsu, New Taipei (TW); Wei-Chen Kao, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 0 days.

(21) Appl. No.: 15/499,826

(22) Filed: Apr. 27, 2017

(30) Foreign Application Priority Data

Dec. 19, 2016 (TW) .............................. 105219291 U

(51) Int. Cl.
| | |
|---|---|
| *F16C 11/04* | (2006.01) |
| *E05D 3/12* | (2006.01) |
| *E05D 11/00* | (2006.01) |
| *E05D 7/00* | (2006.01) |

(52) U.S. Cl.
CPC ................ *F16C 11/04* (2013.01); *E05D 3/12* (2013.01); *E05D 7/00* (2013.01); *E05D 11/00* (2013.01); *E05Y 2900/606* (2013.01); *Y10T 16/5406* (2015.01)

(58) Field of Classification Search
CPC . Y10T 16/5406; Y10T 16/544; Y10T 16/542; Y10T 16/54038; F16C 11/04; E05D 3/12; E05D 7/00; E05D 7/06; E05D 11/00; E05D 3/18; E05Y 2900/606; G06F 1/1681; G06F 1/1637; G06F 1/166; G06F 1/1679; F16M 11/04; F16M 11/10; F16M 13/005; H05K 5/0226

USPC ............. 16/348, 357, 355, 342; 361/679.27; 248/917, 919, 688; 403/116
See application file for complete search history.

(56) References Cited

U.S. PATENT DOCUMENTS

| | | | | |
|---|---|---|---|---|
| 8,118,274 | B2* | 2/2012 | McClure | A47B 23/042 248/455 |
| 9,304,549 | B2* | 4/2016 | Siddiqui | E05D 7/00 |
| 9,447,620 | B2* | 9/2016 | Park | E05D 11/10 |
| 9,752,361 | B2* | 9/2017 | Park | E05D 11/082 |
| 2011/0036965 | A1* | 2/2011 | Zhang | F16M 11/10 248/688 |
| 2013/0015311 | A1* | 1/2013 | Kim | H05K 5/0234 248/393 |

(Continued)

FOREIGN PATENT DOCUMENTS

| | | |
|---|---|---|
| CN | 205260602 | 5/2016 |
| TW | M518458 | 3/2016 |

*Primary Examiner* — William Miller
(74) *Attorney, Agent, or Firm* — Guice Patents PLLC

(57) ABSTRACT

A rotation shaft device comprises: a base; a first rotation unit; a pair of second rotation units; a torsion unit, having a connection rod; a slide mechanism, including a slide block disposed in a hollow slot and having the top surface formed with a pivotal part, and a pair of slide pieces are disposed at two opposite sides of the slide bock; and a bottom seat, formed with an accommodation part, two opposite sides defined on a top surface of the accommodation part and/or a bottom surface of the base are formed with a pair of slide slots allowing the pair of slide pieces to be disposed; the slide block is pivotally connected to the torsion unit and the first rotation unit, thus the pair of slide pieces can stably slide between the bottom surface of the base and the pair of slide slots.

18 Claims, 17 Drawing Sheets

(56) References Cited

U.S. PATENT DOCUMENTS

| | | | |
|---|---|---|---|
| 2013/0193292 A1* | 8/2013 | Hsu | G06F 1/1624 |
| | | | 248/346.06 |
| 2014/0174960 A1* | 6/2014 | Zhu | H04M 1/04 |
| | | | 206/45.24 |
| 2014/0293534 A1* | 10/2014 | Siddiqui | E05D 7/00 |
| | | | 361/679.55 |
| 2015/0212553 A1* | 7/2015 | Park | G06F 1/1681 |
| | | | 361/679.27 |
| 2016/0083989 A1* | 3/2016 | Kuo | E05D 1/04 |
| | | | 16/355 |
| 2017/0003719 A1* | 1/2017 | Siddiqui | E05D 1/04 |

* cited by examiner

ROTATION SHAFT DEVICE

BACKGROUND OF THE INVENTION

1. Field of the Invention

The present invention relates to a rotation shaft device, especially to a rotation shaft device disposed between a flat electronic device and a supporter.

2. Description of Related Art

A flat electronic device, for example a tablet computer or an all in one (MO) computer, is pivoted with a supporter for enabling the flat electronic device to be arranged in a standing status, and the supporter is connected with a rotation shaft device for achieving effects of rotating (for unfolding or folding) and supporting the tablet computer to be in the standing status. The rotation shaft device includes a core shaft and a friction disk disposed on the core shaft, at least one elastic disk or a spring, and an anti-loosening nut.

Wherein, the main component for achieving the rotation effect is the core shaft, one end of the core shaft is pivoted with the supporter located in a rotation center line, and the other end of the core shaft is pivoted with the flat electronic device, so that the supporter is able to be rotated relative to the flat electronic device. If an obvious torsion varying and positioning effect is desired to be provided, the core shaft is sleeved with a set of interfering units capable of being mutually pressed or engaged (as known as a cam mechanism). As such, the rotation shaft device is the main component enabling the flat electronic device to be easily converted from a horizontal status into the standing status.

However, when a user touches for operating the flat electronic device, for example a tablet computer, the tablet computer shall not only be horizontally placed but also the tablet computer should be provided with a function of adjusting the standing angle in a stage-less or multi-stage means, but the above-mentioned rotation shaft device can only be used for supporting the tablet computer without the stage-less or multi-stage adjusting and positioning effect, so that the tablet computer is unable to be provided with a stably positioning effect while being in the standing status at various angles. In addition, the core shaft of the rotation shaft device and the rotation center line of the supporter are coaxially arranged, so that the pivoting portion of the tablet computer may be relatively protruded and not easily be shield by the supporter, when the supporter is folded to be adjacent to a wall surface of the tablet computer, a flatly and adjacently arranging effect of the supporter may be affected.

As such, skilled people in the art have developed various rotation shaft devices suitable to be used in the tablet computer and the supporter for improving the shortages of the above-mentioned rotation shaft device, take the automatic bouncing shaft apparatus disclosed in Taiwan Patent No. M518458 for example, the interior thereof has a case body formed with an accommodation space, a torsion and elastic force biased mechanism and a torsion generating device are disposed in the accommodation space, the torsion and elastic force biased mechanism includes a biased mechanism having a pressing block, and the biased mechanism is connected and linked with a connection sheet, the torsion generating device is disposed and fastened in the biased mechanism; and an elastic unit is abutted against the pressing block; when the connection sheet is released from an positioned status, the biased mechanism is linked for enabling the torsion generating device to be outwardly and biasedly rotated, the pressing block is inclined due to the biased rotation, and the elastic unit is able to allow the biased mechanism to be automatically bounced to a preset angle, so that a user can easily operate the shaft apparatus.

Moreover, take the hinge of displacement terminal and the displacement terminal disclosed in China Patent No. CN205260602 for example, the hinge of displacement terminal includes a first rotation body, the first rotation body is connected to a friction structure for providing a function of stopping and positioning at any desired timing, the first rotation body and the friction structure are connected by utilizing a connection rod mechanism. The friction structure includes a friction sleeve and a shaft capable of being oppositely displaced along the axial direction, the first rotation body is connected to the friction sleeve capable of being axially displaced relative to the shaft via the connection rod structure, thereby driving the friction sleeve to be axially displaced. In other words, the connection rod mechanism is able to convert the friction force generated by the axial opposite displacement into a torsion, and different friction forces can be outputted via the friction sleeve working with the friction shaft having dimension variation defined at different locations. However, the above-mentioned friction structure can only provide a timely positioning function to the tablet computer and the supporter.

Because the rotation shaft device is disposed between the flat electronic device and the supporter for generating a torque to counteract external forces applied for operations and the weight of the object, each component in the rotation shaft device shall be formed with a certain thickness for having a proper structural strength; however, for allowing a user to conveniently carry and operate the flat electronic device, being thin and compact is an objective that skilled people in the art has been trying to achieve, if the thickness of the rotation shaft device is too thick, the whole thickness of the flat electronic device would be increased but the structural strength shall not be compromised, thus the above-mentioned conflict is an issue to be solved. As such, how to design a rotation shaft device having less components and having the internal structural space being effectively utilized for achieving advantages of thin in thickness and simple in assembly should be concerned by the skilled people in the art.

SUMMARY OF THE INVENTION

One primary objective of the present invention is to provide a rotation shaft device, which has less components and has the internal structural space being effectively utilized for achieving advantages of thin in thickness and simple in assembly, so that the rotation shaft device would not increase the whole thickness of a flat electronic device, for example a tablet computer or an all-in-one (AIO) computer while the structural strength of the rotation shaft device can be kept.

For achieving said objective, one technical solution provided by the present invention is to provide a rotation shaft device, which comprises: a base, having a hollow slot formed between a pair of lateral walls thereof; a first rotation unit, disposed between the pair of lateral walls, wherein the first rotation unit is formed with a pair of outer walls and a pair of inner walls; a pair of second rotation units, sharing a common rotation center with the first rotation unit, wherein a first rotation guiding structure is disposed between each of the pair of second rotation units and each of the pair of lateral walls, and a second rotation guiding structure is disposed between each of the pair of second rotation units and each of the pair of outer walls; a torsion unit, having a connection rod, wherein a friction torsion mechanism is disposed between one end of the connection rod and the pair of inner walls; and a slide mechanism, including a slide block disposed in the hollow slot, wherein a top surface of the slide block is formed with a pivotal part pivoted with the connection rod, and a pair of slide pieces are disposed at two opposite sides of the slide bock; and a bottom seat, disposed at a bottom end of the base and formed with an accommodation part communicated with the hollow slot, wherein two opposite sides defined on a top surface of the accommodation part and/or a bottom surface of the base are formed with a pair of slide slots allowing the pair of slide pieces to be disposed thereon; the slide block is pivotally connected to the torsion unit and the first rotation unit, so that the pair of slide pieces are able to stably slide between the bottom surface of the base and the pair of slide slots.

For achieving said objective, another technical solution provided by the present invention is to provide a rotation shaft device, which comprises: a base, having a hollow slot formed between a pair of lateral walls thereof; a first rotation unit, disposed between the pair of lateral walls, wherein the first rotation unit is formed with a pair of outer walls and a pair of inner walls; a pair of second rotation units, sharing a common rotation center with the first rotation unit, wherein a first rotation guiding structure is disposed between each of the pair of second rotation units and each of the pair of lateral walls, and a second rotation guiding structure is disposed between each of the pair of second rotation units and each of the pair of outer walls; a torsion unit, having a connection rod, wherein a friction torsion mechanism is disposed between one end of the connection rod and the pair of inner walls; and a slide mechanism, including a slide block disposed in the hollow slot, wherein a top surface of the slide block is formed with a pivotal part pivoted with the connection rod and an engage member, and a pair of slide pieces are disposed at two opposite sides of the slide bock; and a bottom seat, disposed at a bottom end of the base and formed with an accommodation part communicated with the hollow slot, wherein two opposite sides defined on a top surface of the accommodation part and/or a bottom surface of the base are formed with a pair of slide slots allowing the pair of slide pieces to be disposed thereon; the slide block is pivotally connected to the torsion unit and the first rotation unit, so that the pair of slide pieces are able to stably slide between the bottom surface of the base and the pair of slide slots; and an auxiliary member, disposed on a top surface of the base and located at an opposite side of the engage member, a guide rod sleeved with a compression spring is disposed on the engage member and the auxiliary member, and the auxiliary member allows the guide rod to be disposed, so that the compression spring is able to slide with the slide block for forming an energy storing status or an energy releasing status.

For achieving said objective, one another technical solution provided by the present invention is to provide a rotation shaft device, which comprises: a base, having a hollow slot formed between a pair of lateral walls thereof; a first rotation unit, disposed between the pair of lateral walls, wherein the first rotation unit is formed with a pair of outer walls and a pair of inner walls; a pair of second rotation units, sharing a common rotation center with the first rotation unit, wherein a first rotation guiding structure is disposed between each of the pair of second rotation units and each of the pair of lateral walls, and a second rotation guiding structure is disposed between each of the pair of second rotation units and each of the pair of outer walls; a torsion unit, having a connection rod, wherein a friction torsion mechanism is disposed between one end of the connection rod and the pair of inner walls; and a slide mechanism, including a slide block disposed in the hollow slot, wherein a top surface of the slide block is formed with a pivotal part pivoted with the connection rod and an engage member, and a pair of slide pieces are disposed at two opposite sides of the slide bock; and a bottom seat, disposed at a bottom end of the base and formed with an accommodation part communicated with the hollow slot, wherein two opposite sides defined on a top surface of the accommodation part and/or a bottom surface of the base are formed with a pair of slide slots allowing the pair of slide pieces to be disposed thereon; the slide block is pivotally connected to the torsion unit and the first rotation unit, so that the pair of slide pieces are able to stably slide between the bottom surface of the base and the pair of slide slots; and an auxiliary member, disposed on a top surface of the base and located at an opposite side of the engage member, a tension spring is disposed on the engage member and the auxiliary member, and the tension spring is able to slide with the slide block for forming an energy storing status or an energy releasing status.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
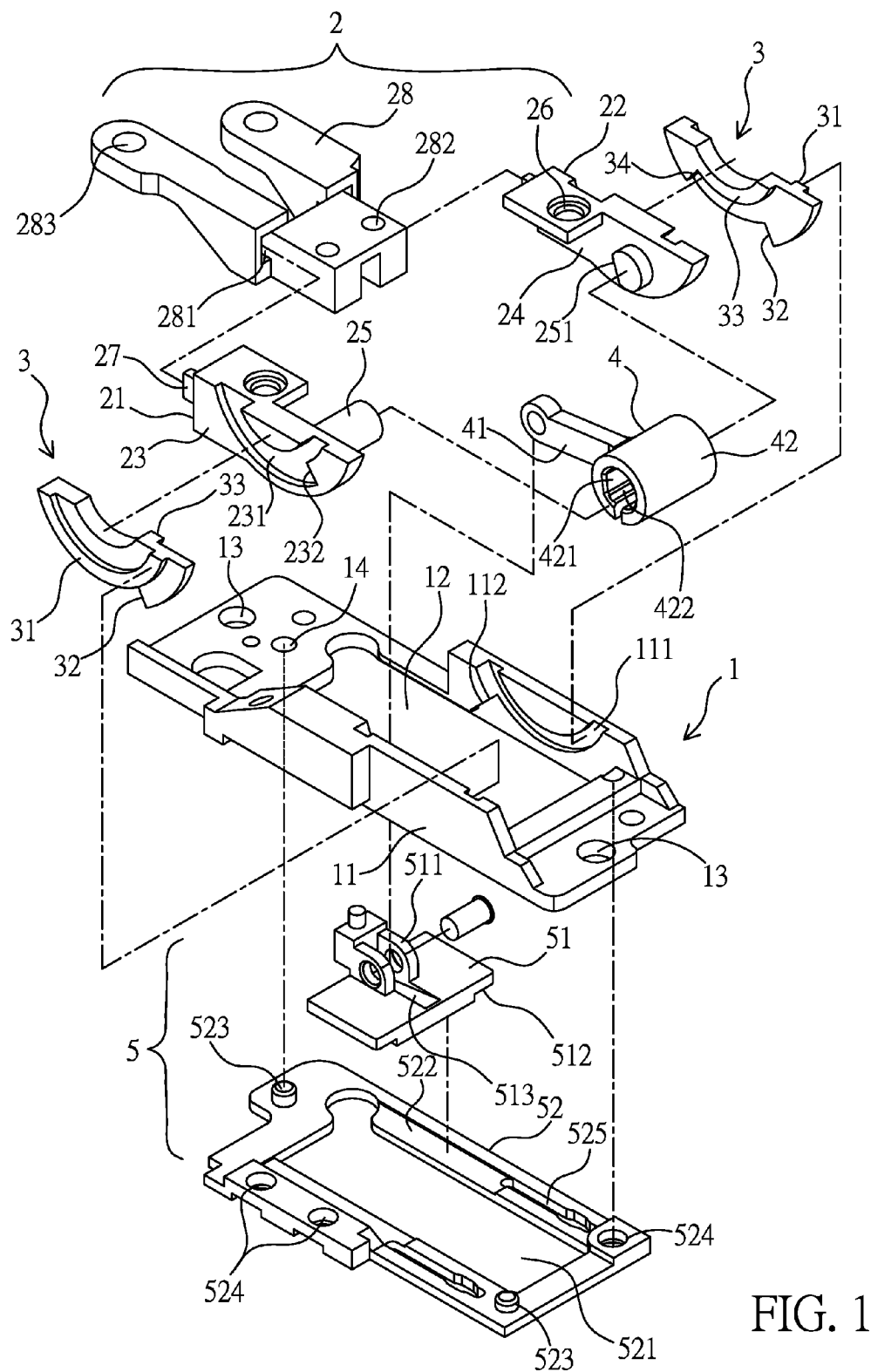
FIG. 1 is a perspective exploded view illustrating a rotation shaft device according a first embodiment of the present invention.

Referring from FIG. 1 to FIG. 6, the present invention provides a rotation shaft device, which comprises a base 1, a first rotation unit 2, a pair of second rotation units 3, a torsion unit 4 and a slide mechanism 5.

The base 1 is formed as a rectangular seat member, a hollow slot 12 is formed between a pair of lateral walls 11 thereof, and a space defined between the pair of lateral walls 11 is served to allow the first rotation unit 2 and the pair of second rotation units 3 to be accommodated and rotated therein. For allowing the first rotation unit 2 and the pair of second rotation units 3 to be smoothly rotated between the pair of lateral walls 11, adjacent surfaces of the pair of lateral walls 11 and the pair of second rotation units 3 are respectively formed with a first rotation guiding structure, for example a first arc-shaped guiding slot 111 and a first arc-shaped guiding rail 31, so that the pair of second rotation units 3 can be rotated along the pair of first arc-shaped guiding slots 111 via the pair of the first arc-shaped guiding rails 31. In addition, the base 1 is formed with at least one first fasten hole 13, so that a conventional fasten member, for example a screw, can be utilized for passing and being fastened with a flat electronic device 6, for example a tablet computer.

The first rotation unit 2 is disposed between the pair of lateral walls 11 of the base 1, and the first rotation unit 2 includes a left rotation member 21 and a right rotation member 22 which are in an engaged status. The left rotation member 21 and the right rotation member 22 are formed with a pair of outer walls 23, a pair of inner walls 24 is axially and correspondingly disposed with a core shaft 25, and rear portions are respectively and radially formed with a first connection hole 26, and a conventional fasten member, for example a screw, is utilized for passing the first connection holes 26 and being fastened with a supporter 7.

Figure 2:
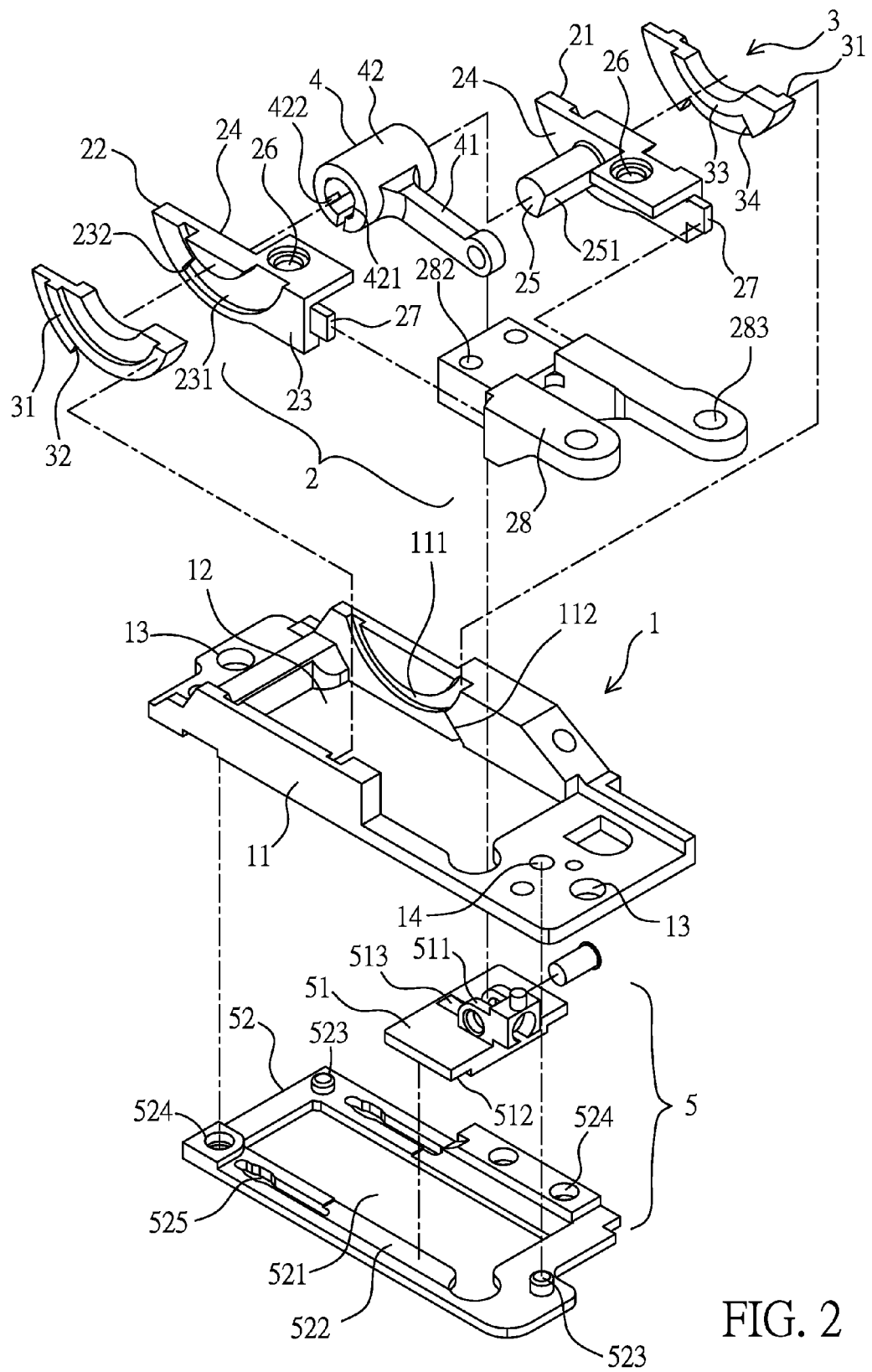
FIG. 2 is another perspective exploded view illustrating the rotation shaft device according the first embodiment of the present invention.

According to another embodiment, the first rotation unit 2 further includes a connection member 28, the connection member 28 is disposed at a rear end of the first rotation unit 2, as shown in FIG. 1 and FIG. 2, rear ends of the left rotation member 21 and the right rotation member 22 are respectively formed with a positioning tenon 27, and a front end of the connection member 28 is formed with two positioning slots 281 allowing the positioning tenons 27 to be inserted and positioned. A conventional fasten member, for example a screw, is utilized for passing each of the first connection holes 26 and being fastened in a second connection hole 282 correspondingly formed on the connection member 28, so that the left rotation member 21, the right rotation member 22 and the connection member 28 are enabled to be combined as one piece. In other words, the first rotation unit 2 and the connection member 28 can be combined as one piece by utilizing a positioning and fastening mechanism for forming a linking status. A rear end of the connection member 28 is formed with at least one second fasten hole 283, and a conventional fasten member, for example a screw, is utilized for passing the at least one second fasten hole 283 and being fastened with the supporter 7 (as show in FIG. 6).

The pair of second rotation units 3 are respectively disposed between each of the pair of lateral walls 11 of the base 1 and each of the pair of outer walls 23 of the first rotation unit 2, and the first rotation unit 2 and the pair of second rotation units 3 share a common rotation center. Based on what has been disclosed above, the above-mentioned first rotation guiding structure is respectively disposed between each of the pair of second rotation units 3 and each of the pair of lateral walls 11 of the base 1, for example the above-mentioned first arc-shaped guiding slot 111 and the above-mentioned first arc-shaped guiding rail 31, so that the pair of second rotation units 3 can be rotated along the pair of first arc-shaped guiding slots 111 via the pair of first arc-shaped guiding rails 31. In addition, a second rotation guiding structure is respectively disposed between each of the pair of outer walls 23 of the first rotation unit 2 and each of the pair of second rotation units 3, for example a second arc-shaped guiding slot 231 and a second arc-shaped guiding rail 33, so that the first rotation unit 2 can be rotated along the pair of second arc-shaped guiding rails 33 via the pair of second arc-shaped guiding slots 231.

Moreover, for forming a limitation to the maximum unfolding angle of the first rotation unit 2, a circumference of each of the first arc-shaped guiding slots 111 is communicated with a first position limiting block 112, and each of the pair of second rotation units 3 is respectively and correspondingly disposed with a first position limiting protrusion 32 capable of being abutted against the first position limiting block 112, a circumference of each of the second arc-shaped guiding slots 231 is communicated with a second position limiting block 232, and each of the pair of second rotation units 3 is respectively and correspondingly disposed with a second position limiting protrusion 34 capable of being abutted against the second position limiting block 232.

Figure 8A:
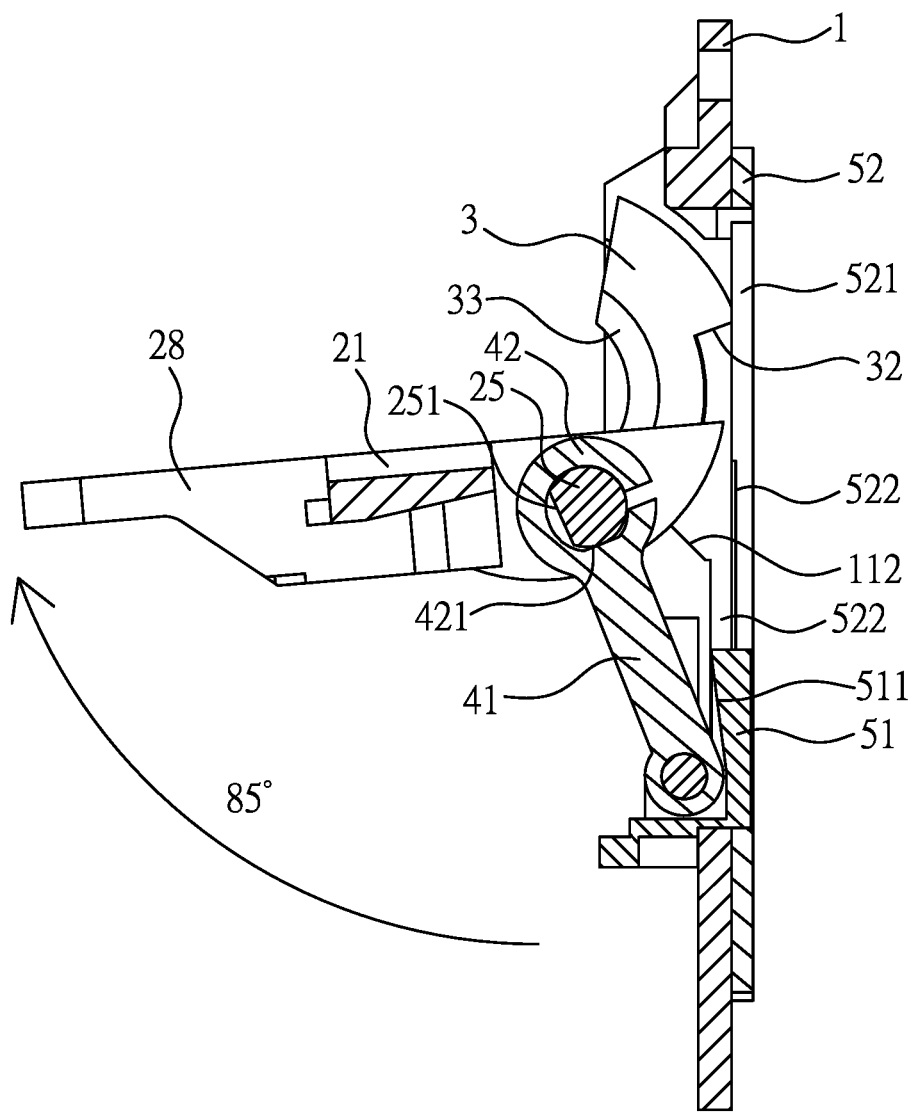
FIG. 8a is a cross sectional view illustrating the rotation shaft device being in a status of being unfolded to 85 degrees according to the present invention.
Figure 9A:
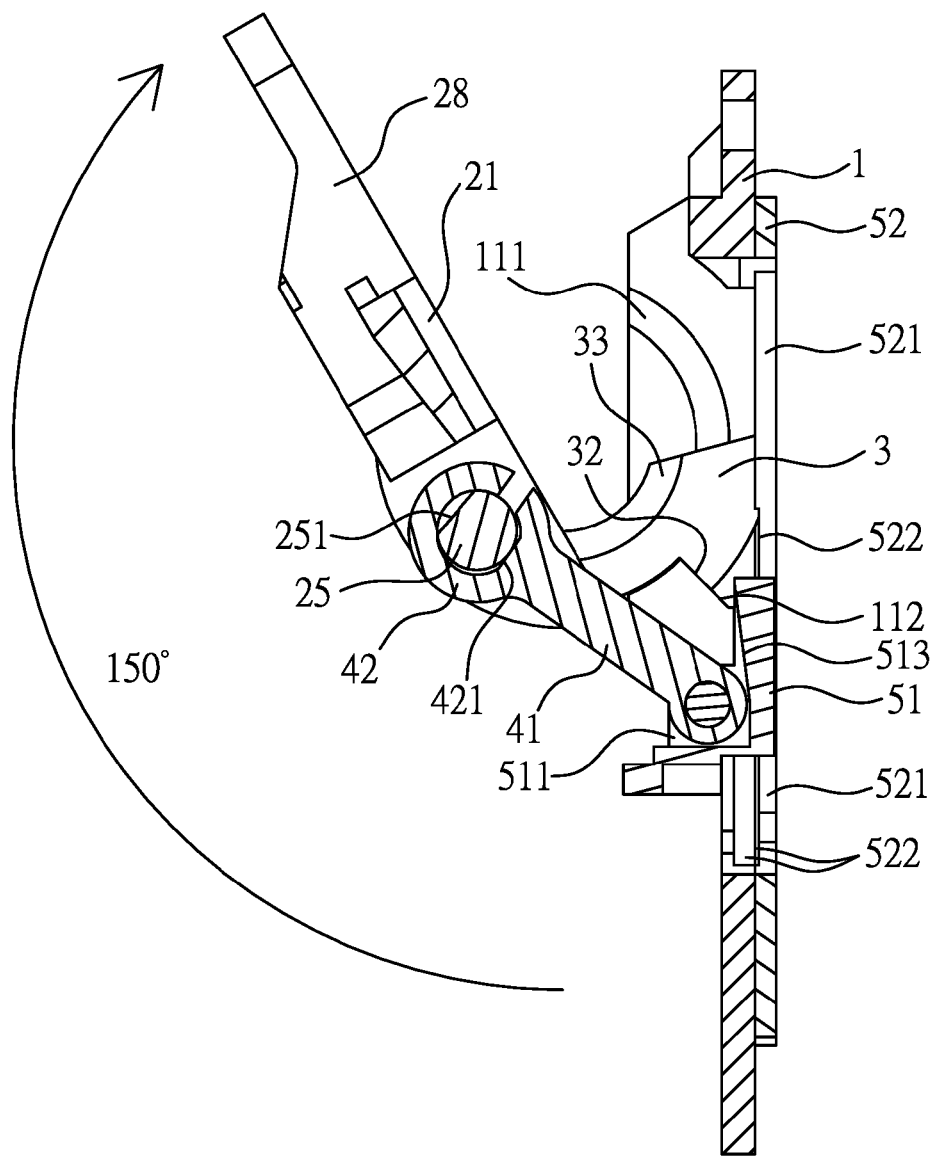
FIG. 9a is a cross sectional view illustrating the rotation shaft device being in a status of being unfolded to 150 degrees according to the present invention.

The torsion unit 4 is disposed with a connection rod 41, one end of the connection rod 41 is axially formed with a C-shaped covering member 42 sleeved on the core shaft 25, the other end of the connection rod 41 is pivoted with the slide mechanism 5. In other words, a friction torsion mechanism is formed by the core shaft 25 and the C-shaped covering member 42. An outer circumference of the core shaft 25 is formed with a first plane 251, and an inner circumference of the C-shaped covering member 42 is formed with a second plane 421, so that when the core shaft 25 is rotated to different angles, the C-shaped covering member 42 can be pressed or loosened (not being pressed) for allowing different radial widths to be formed; as such, when the core shaft 25 of the first rotation unit 2 is rotated to an angle at which the C-shaped covering member 42 is pressed (as shown in FIG. 7a, FIG. 8a and FIG. 9a), a friction torsion is formed for enabling the supporter 7 connected to the first rotation unit 2 to be provided a freely stopping effect within an angle range, for example 35 to 150 degrees. Moreover, an inner wall of the C-shaped covering member 42 is formed with at least one oil groove 422 for storing lubrication oil, so that the lubricating effect between the core shaft 25 and the C-shaped covering member 42 can be enhanced and a greater wearing resistance can be provided. Wherein, the quantity of the at least one oil groove 422 is two, and the two oil grooves 422 are preferably to be oppositely formed at two sides defined on the inner wall of the C-shaped covering member 42, thus the assembly and the production can be facilitated.

The slide mechanism 5 includes a slide block 51 disposed in the hollow slot 12, a top surface of the slide block 51 is formed with a pivotal part 511 pivoted with the connection rod 41, and two opposite sides thereof, for example the left and the right sides, are disposed with a pair of side pieces 512. The slide mechanism 5 further includes a bottom seat 52 which is detachably disposed on a bottom surface of the base 1. The bottom seat 52 is formed with an accommodation part 521 communicated with the hollow slot 12, two opposite sides defined on a top surface of the accommodation part 521 and/or the bottom surface of the base 1 are formed with a pair of slide slots 522 allowing the pair of slide pieces 512 to be disposed thereon, the pair of slide slots 522 can be selectively and concavely formed on the bottom surface of the base 1, the top surface of the accommodation part 521 of the bottom seat 52, or adjacent surfaces defined between the bottom surface of the base 1 and the top surface of the accommodation part 521 of the bottom seat 52, so that the structural design, the assembly and the production of the rotation shaft device can be facilitated. With the pair of slide pieces 512 being respectively matched and received in the pair of slide slots 522, the slide block 51 can be prevented from being turned over or inclined, so as to form a linear sliding motion, and the relative movements of the C-shaped covering member 42 and the core shaft 25 can also be stabilized. The bottom seat 52 is fastened on the bottom surface of the base 1, for example a conventional positioning structure for example two convex tenons 523 at diagonal corners of the bottom seat 52 are respectively mounted in two tenon holes 14 correspondingly formed on the bottom surface of the base 1 (one of the tenon holes 14 is shown in FIG. 1 and FIG. 2, and the other tenon hole 14 is shown in FIG. 5b, FIG. 7b, FIG. 8b and FIG. 9b), thereby allowing a positioning status to be formed, and a conventional fasten member, for example a screw, is utilized for passing at least two penetrated holes 524 formed on the bottom seat 52 and being fastened at the bottom end of the base 1, thereby allowing the base 1 and the bottom seat 52 to be combined as one piece, and the slide block 51 is pivotally connected to the torsion unit 4 and the first rotation unit 2, thereby enabling the pair of slide pieces 521 to smoothly and radially slide along the pair of slide slots 522.

For allowing the whole thickness to be reduced and effectively utilizing the internal space of the structure while operations between components still being remained, the pivotal part 511 is formed with a recessed slot 513 on the top surface of the slide block 51 and allowing a part of the connection rod 41 to be accommodated, so that the thickness of the slide block 51 can be reduced, and after being thinned, when the supporter 7 is in a folded status at zero degree relative to the tablet computer 6, the slide block 51 allows the connection rod 41 to be partially accommodated via the recessed slot 513 and the pivotal part 511.

Moreover, the bottom seat 52 is respectively formed with an elongated slit 525 corresponding to each of the pair of second rotation units 3, so that each of the first position limiting protrusions 32 or a part thereof is allowed to enter or pass for enabling the pair of second rotation units 3 in a rotating status to be parallel with each other.

Figure 3:
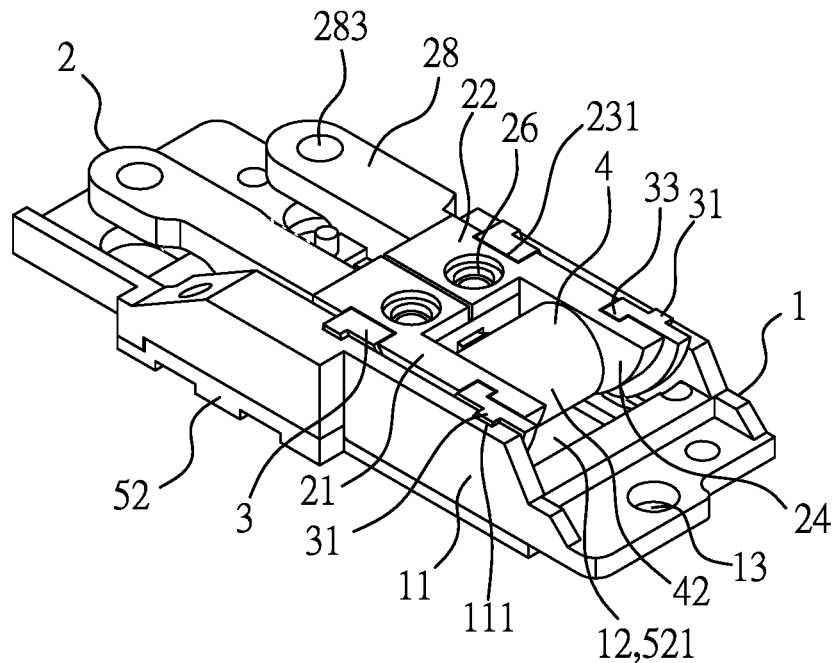
FIG. 3 is a perspective view illustrating the assembly of the rotation shaft device according to the first embodiment of the present invention.
Figure 4:
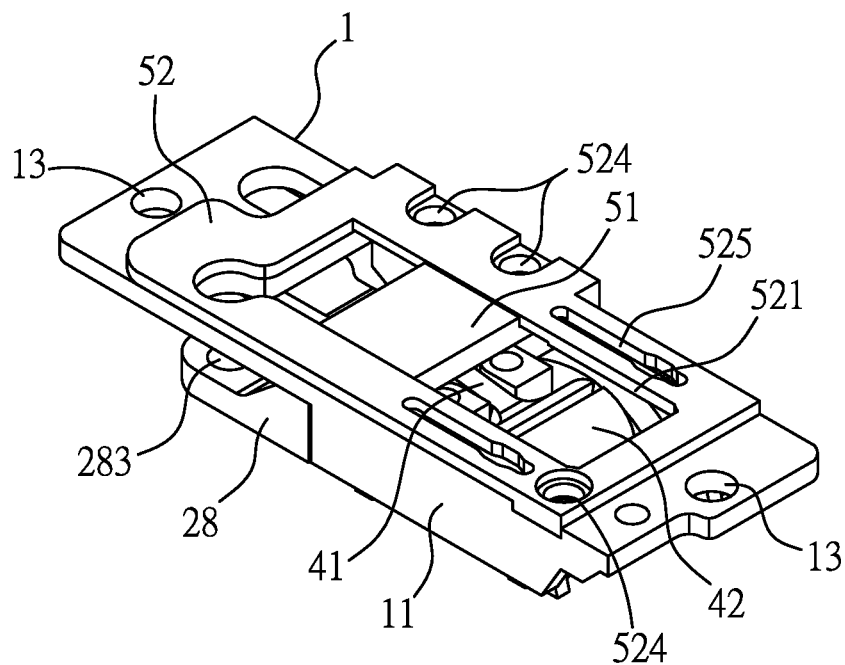
FIG. 4 is another perspective view illustrating the assembly of the rotation shaft device according to the first embodiment of the present invention.

Based on what has been disclosed above, the base 1, the first rotation unit 2, the pair of second rotation units 3, the torsion unit 4 and the slide mechanism 5 are respectively manufactured with a metal injection molding (MIM) means, so that each of the components is provided with an advantage of wearing resistance, and after the above-mentioned components are assembled, effects of thin in thickness and having an reinforced structure are provided to the rotation shaft device as shown in FIG. 3 and FIG. 4, which are front and rear perspective views of the rotation shaft device.

Figure 6:
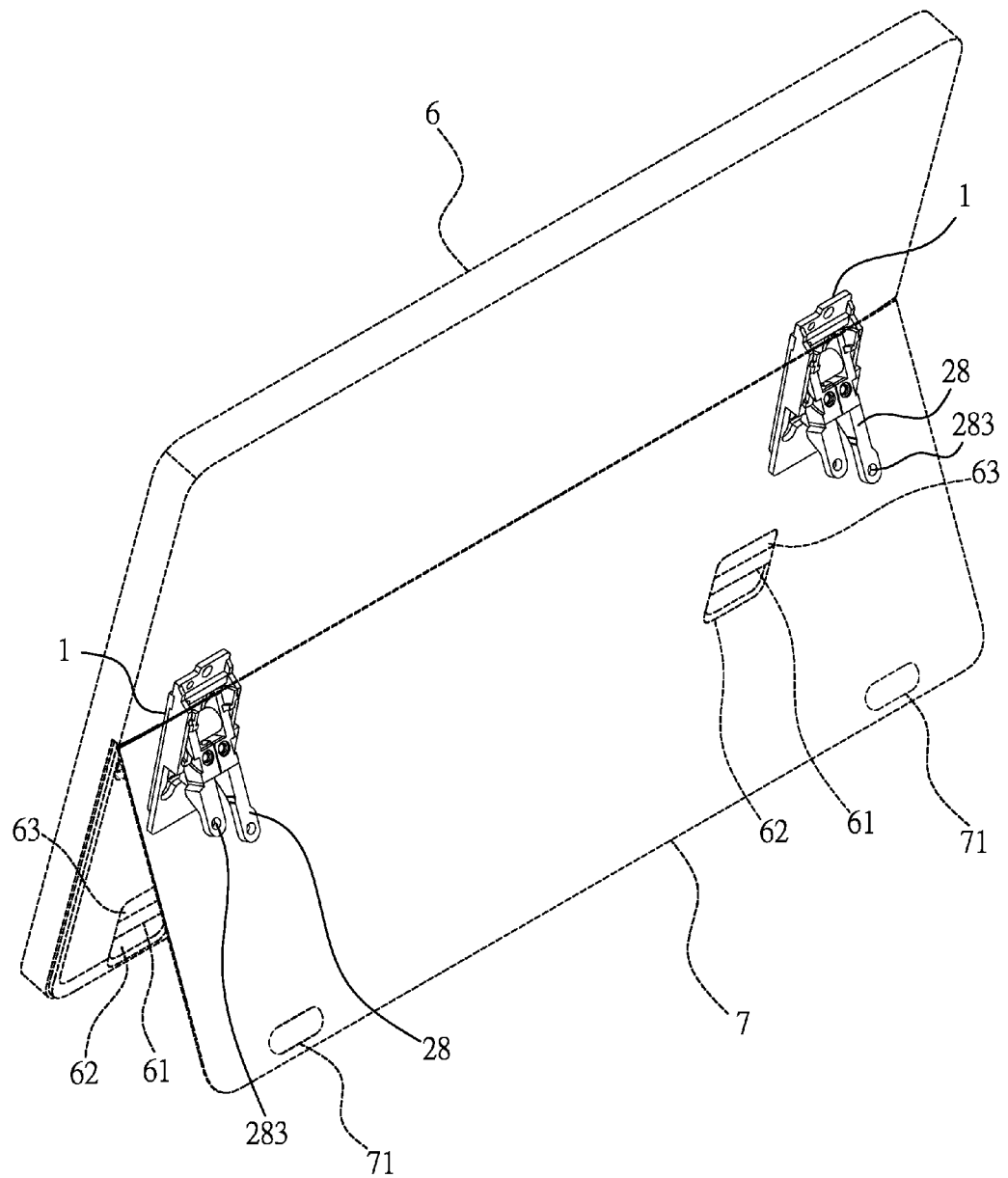
FIG. 6 is a perspective view illustrating the rotation shaft device being assembled with a flat electronic device and the supporter according to the present invention.

When being assembled, a pair of bases 1 of a pair of rotation shaft devices are connected at two sides defined on a rear surface of a tablet computer 6, a pair of first rotation units 2 of the pair of rotation shaft devices are connected at two sides defined at the front end of a supporter 7, two adjacent surfaces of the rear surface of the tablet computer 6 and the supporter 7 are respectively disposed with a pair of movable magnets 61 and a pair of fixed magnets 71 (as shown in FIG. 6), so that the supporter 7 is able to press the pair of first rotation units 2 through an attracting effect provided by the pair of movable magnets 61 and the pair of fixed magnets 71, and the supporter 7 is in a locked status at zero degree relative to the tablet computer 6. The pair of movable magnets 61 are respectively accommodated in an accommodation slot 62 formed at two sides defined on the rear surface of the tablet computer 6, and one side defined in each of the accommodation slots 62 is disposed with a magnetic member 63, for example an iron sheet or a magnet, at a location which is not corresponding to each of the fixed magnets 71, so that when each of the fixed magnets 71 is yet fully attracted to each of the movable magnets 61, each of the magnetic members 63 is able to respectively attract each of the movable magnets 61 to be displaced for forming an unlocked status.

Figure 5A:
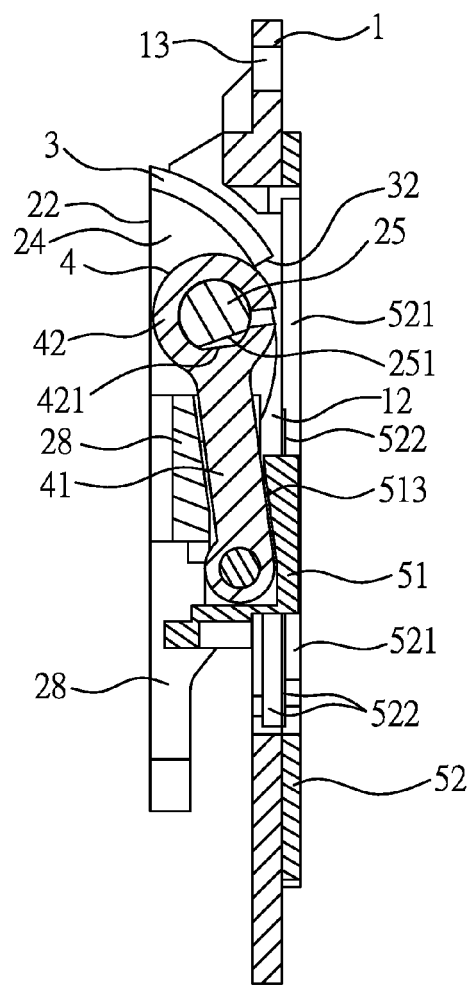
FIG. 5a is a cross sectional view illustrating the supporter being in a locked status and the rotation shaft device being in a status of zero degree according to the present invention.
Figure 5B:
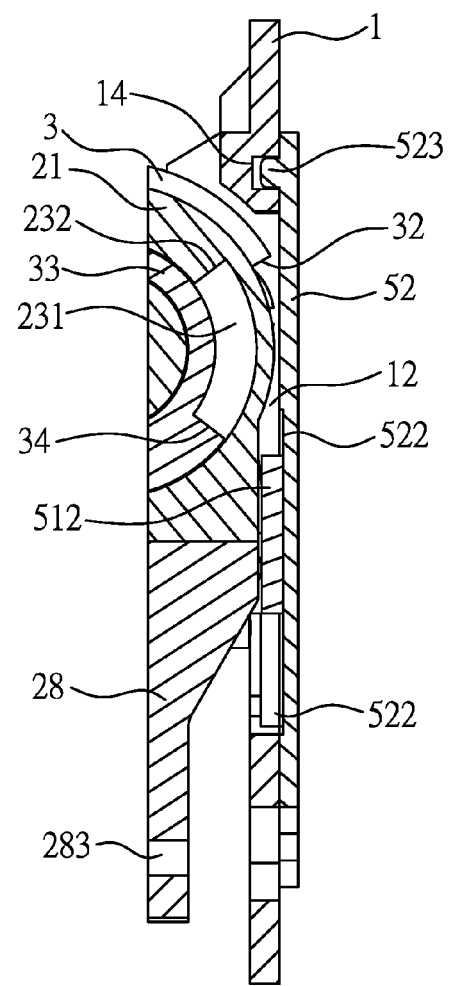
FIG. 5b is another cross sectional view illustrating the supporter being in the locked status and the rotation shaft device being in the status of zero degree according to the present invention.

When the supporter 7 is in the locked status at zero degree relative to the tablet computer 6, as shown in FIG. 5a and FIG. 5b, the pair of first arc-shaped guiding rails 31 of the pair of second rotation units 3 are received in the pair of first arc-shaped guiding slots 111, and the pair of second arc-shaped guiding rails 33 are received in the pair of second arc-shaped guiding slots 231, so that the first rotation unit 2 is pressed, and the slide block 51 is pulled by the torsion unit 4.

When the supporter 7 is unfolded in an early stage, the pair of fixed magnets 71 are yet fully attracted to the pair of movable magnets 61, and the pair of movable magnets 61 are displaced due to a magnetic attraction force of the pair of magnetic members 63, thus the attracting status of the pair of movable magnets 61 and the pair of fixed magnets 71 is released and the unlocked status is formed. After the unlocked status is formed, the slide mechanism 5 is able to work with the torsion unit 4 and the friction torsion mechanism for forming the rotation shaft device having an effect of stably sliding.

Figure 7B:
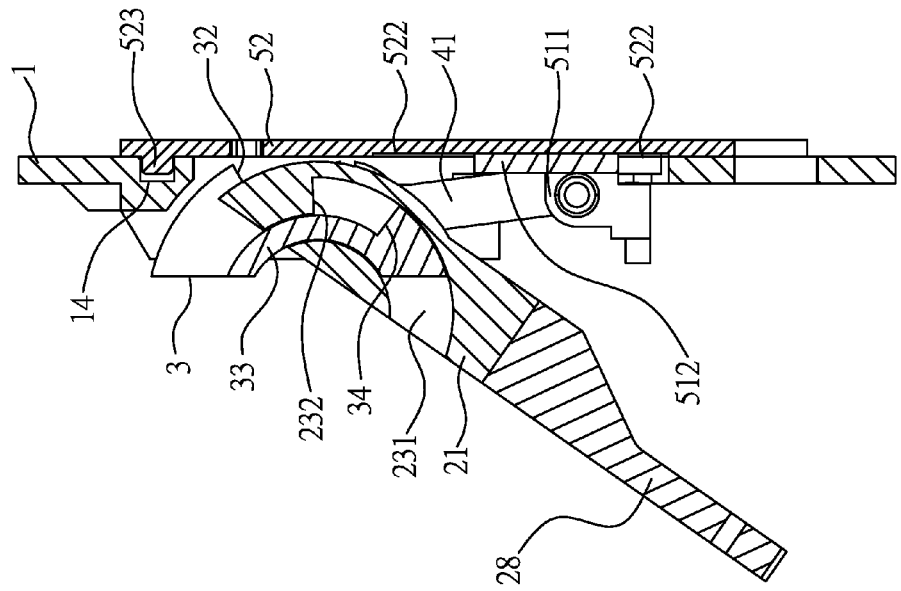
FIG. 7b is another cross sectional view illustrating the supporter being in the unlocked status and the rotation shaft device being in the status of being automatically unfolded to 35 degrees according to the present invention.
Figure 7A:
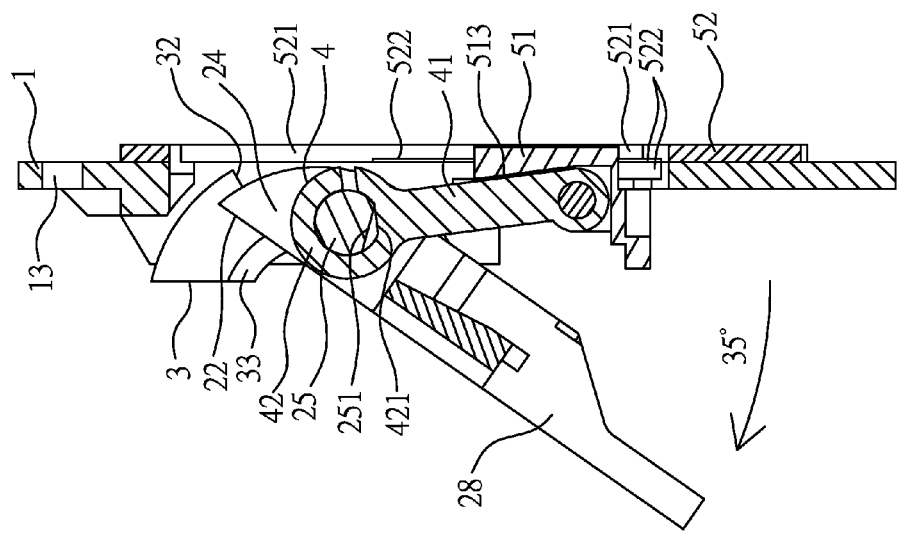
FIG. 7a is a cross sectional view illustrating the supporter being in an unlocked status and the rotation shaft device being in a status of being automatically unfolded to 35 degrees according to the present invention.

In the early unfolding stage of the supporter 7, the C-shaped covering member 42 is not pressed while the core shaft 25 of the friction torsion mechanism is rotated, so that the pair of slide pieces 512 of the slide block 51 can stably and radially slide downward along the pair of slide slots 522 of the bottom seat 52, until the supporter 7 is rotated and unfolded to a first preset angle, for example 35 degrees, relative to the tablet computer 6, as shown in FIG. 7*a* and FIG. 7*b*.

At this moment, the pair of first arc-shaped guiding rails 31 of the pair of second rotation units 3 are still received in the pair of first arc-shaped guiding slots 111, and the pair of second arc-shaped guiding slots 231 of the first rotation unit 2 are rotated to the first preset angle, for example 35 degrees, along the pair of second arc-shaped guiding rails 33 of the pair of second rotation units 3, so that the supporter 7 is provided with the unfolding motion as shown in FIG. 6. Accordingly, the tablet computer 6 is able to in a standing status through the unfolding effect provided by the rotation shaft device to the supporter 7, and a user can easily view images displayed by the tablet computer 6.

Figure 8B:
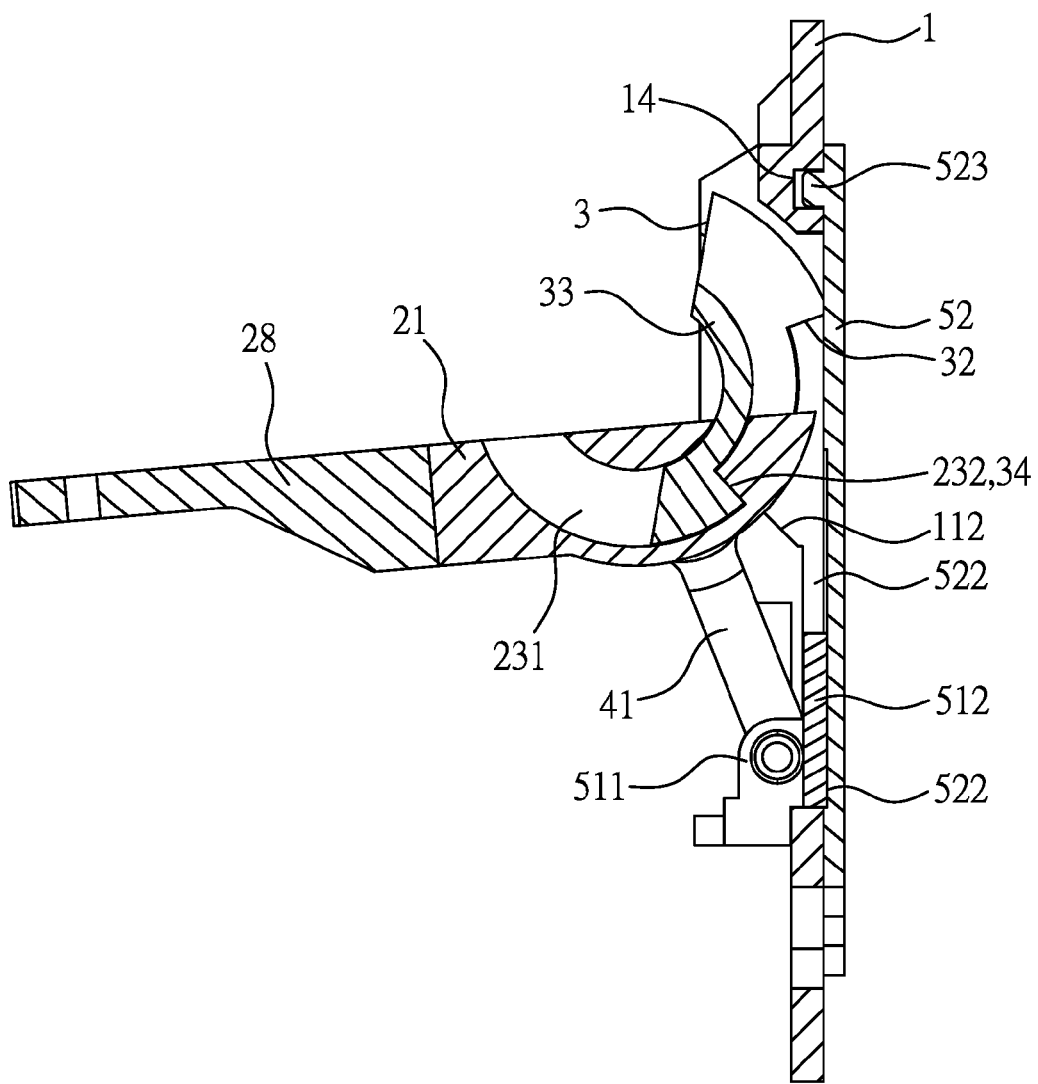
FIG. 8b is another cross sectional view illustrating the rotation shaft device being in the status of being unfolded to 85 degrees according to the present invention.

When the user further unfolds the supporter 7, the pair of slide pieces 512 of the slide block 51 continuously and radially slide downward to a bottom distal end along the pair of slide slots 522 of the bottom seat 52, until the pair of second arc-shaped guiding slots 231 of the first rotation unit 2 are rotated to a second preset angle, for example 85 degrees, along the pair of second arc-shaped guiding rails 33 of the pair of second rotation unit 3, as shown in FIG. 8*a* and FIG. 8*b*. The second position limiting blocks 232 have already pushed the second position limiting protrusions 34 of the pair of second rotation units 3 (as shown in FIG. 8*b*), so that the pair of second arc-shaped guiding rails 33 are rotated along the pair of second arc-shaped guiding slots 231, and the pair of first arc-shaped guiding rails 31 are rotated along the pair of first arc-shaped guiding slots 111. At this moment, the core shaft 25 is rotated with the first rotation unit 2, the slide block 51 is pulled by the torsion unit 4 for being ready to be recovered, and one end of each of the first position limiting protrusions 32 is allowed to enter each of the corresponding elongated slits 525, so that each of the pair of second rotation units 3 is prevented from being inclined during rotations.

On the other hand, during the process of the first rotation unit 2 being rotated from the first preset angle to the second preset angle, the friction torsion is gradually increased via the C-shaped covering member 42 being continuously pressed by the core shaft 25. As such, the effect of freely stopping the tablet computer 6 within a standing angle range can be achieved by the friction torsion.

Figure 9B:
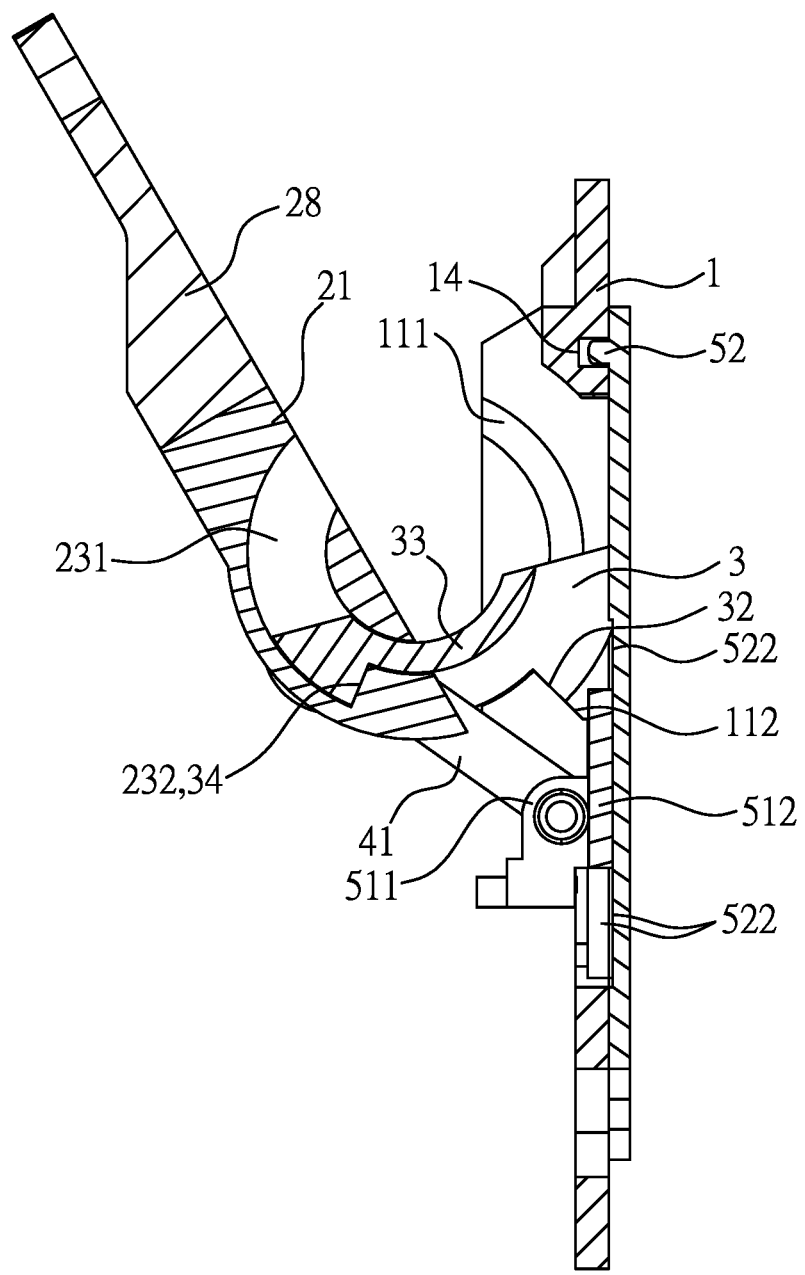
FIG. 9b is another cross sectional view illustrating the rotation shaft device being in the status of being unfolded to 150 degrees according to the present invention.
Figure 9C:
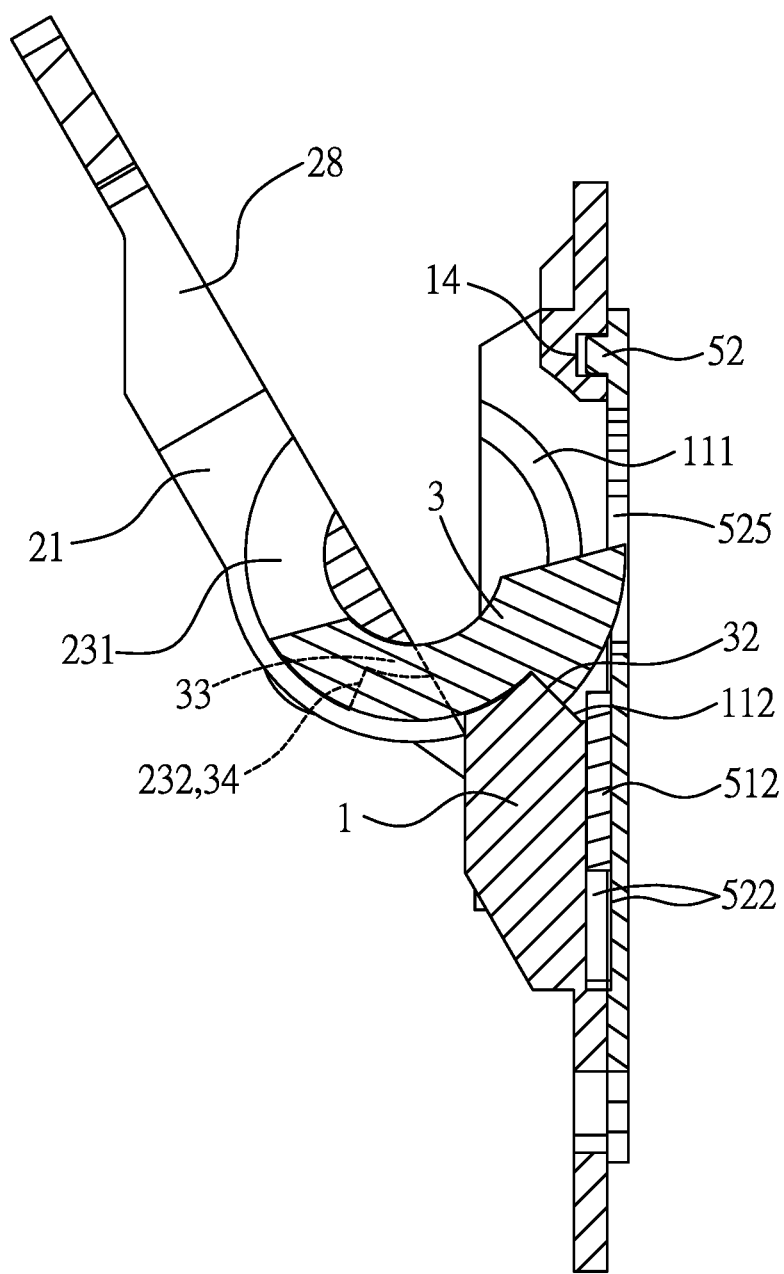
FIG. 9c is one another cross sectional view illustrating the rotation shaft device being in the status of being unfolded to 150 degrees according to the present invention.

When the user further unfolds the supporter 7, and the second preset angle (85 degrees) is exceeded and a maximum unfolding angle, for example 150 degrees, is reached, as shown from FIG. 9*a* to FIG. 9*c*, the first rotation unit 2 upwardly and radially slides through the sliding block 51 being pulled by the torsion unit 4, and during this process, the C-shaped covering member 42 is still continuously pressed by the core shaft 25 for gradually increasing the friction torsion. The second position limiting protrusions 34 of the pair of second rotation units 3 (as shown in FIG. 9*b*) are still pushed by the second position limiting blocks 232, so that the pair of second arc-shaped guiding rails 33 are rotated along the pair of second arc-shaped guiding slots 231, and the pair of first arc-shaped guiding rails 31 are rotated along the pair of first arc-shaped guiding slots 111, and the first position limiting protrusions 32 are allowed to pass along the elongated slits 525, thus the pair of second rotation units 3 in the rotating status can be remained to be parallel with each other until one end of the first position limiting protrusion 32 being protruded out from the elongated slit 525 and abutted against the first position limiting block 112 (as shown in FIG. 9*c*), so that the first rotation unit 2 is formed with the maximum unfolding angle.

When the first rotation unit 2 is located between the second preset angle, for example 85 degrees, and the maximum unfolding angle, for example 150 degrees, the user can place the tablet computer 6 on a table surface for processing various operations, for example texting, tapping or sliding, the slide block 51 of the slide mechanism 5 is able to provide a stable and radial sliding function between the base 1 and the bottom seat 52, and the friction torsion between the core shaft 25 and the C-shaped covering member 42 can be served to counteract forces applied during the operations and the weight of the tablet computer 6. As such, the unfolding angle of the supporter 7 relative to the tablet computer 6 can be prevented from being altered during the operations.

If the supporter 7 is desired to be folded, a reverse rotation, for example from 150 to 85 degrees, is processed, because the friction torsion generated by the friction torsion mechanism is gradually smaller than a friction torsion of a normal rotating motion within the same angle range, the folding operation can be facilitate.

Based on what has been disclosed in the first embodiment, the friction torsion mechanism has different friction torsions respectively during the unfolding and the folding process of the supporter 7 relative to the tablet computer 6, in order to satisfy different design requirements in the limited internal structural space after the whole thickness being reduced, a staged torsion adjusting function can be achieved through a combination design of an auxiliary member 8, an engage member 514 and at least one spring 81 or 83 working with the friction torsion mechanism; for providing a clear illustration, an early unfolding stage and a later unfolding stage are respectively defined in the rotating and unfolding process of the supporter 7 relative to the tablet computer 6, and an early folding stage and a later folding stage are respectively defined in the folding process of the supporter 7 relative to the tablet computer 6; hereinafter the second preset angle, for example 85 degrees, is adopted as a dividing point for the early stage and the later stage, but it is to be noted that the scope of the present invention is not limited to the above-mentioned angle in actual practice.

Figure 10:
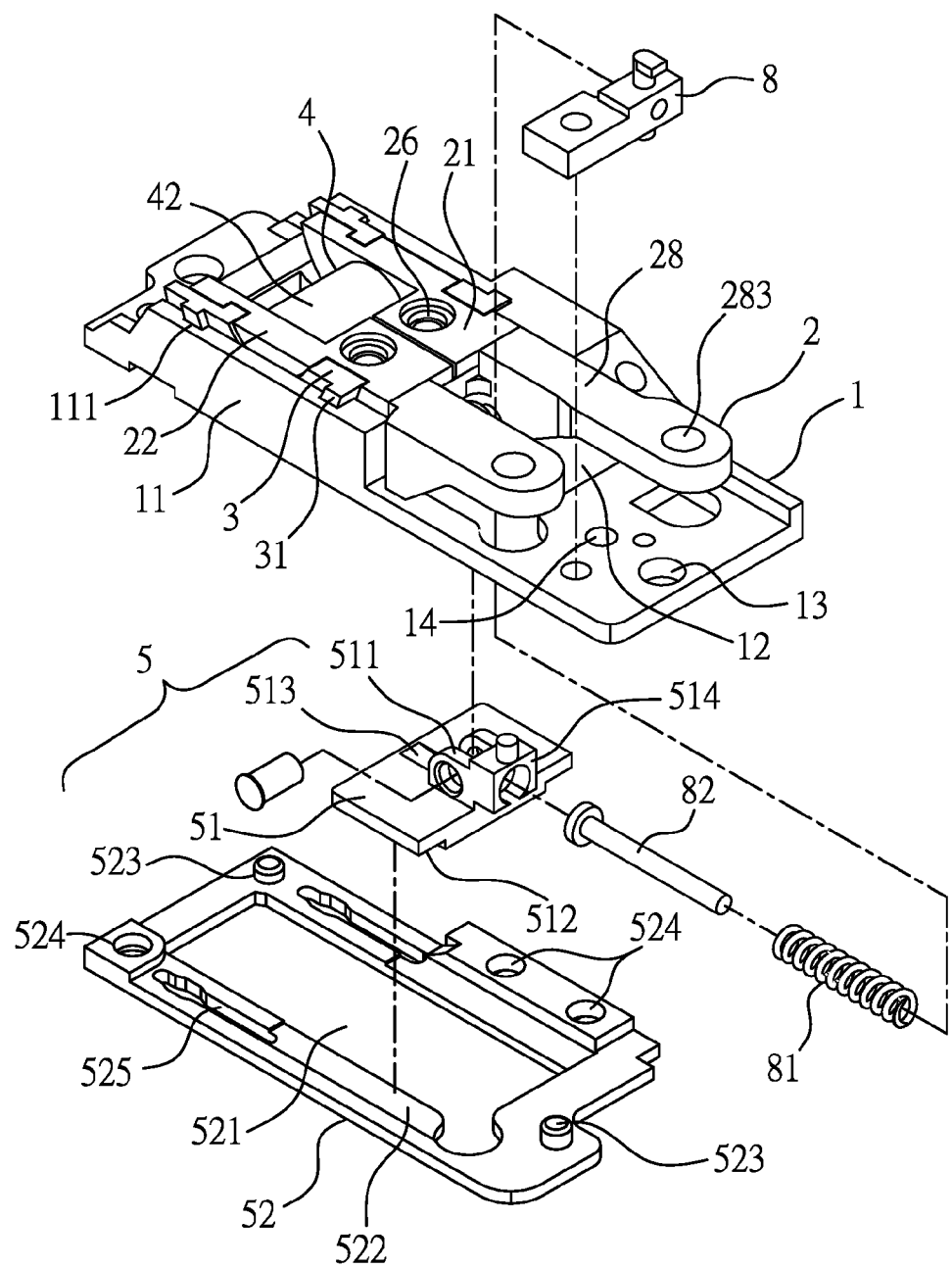
FIG. 10 is a perspective exploded view illustrating the rotation shaft device according a second embodiment of the present invention.
Figure 11:
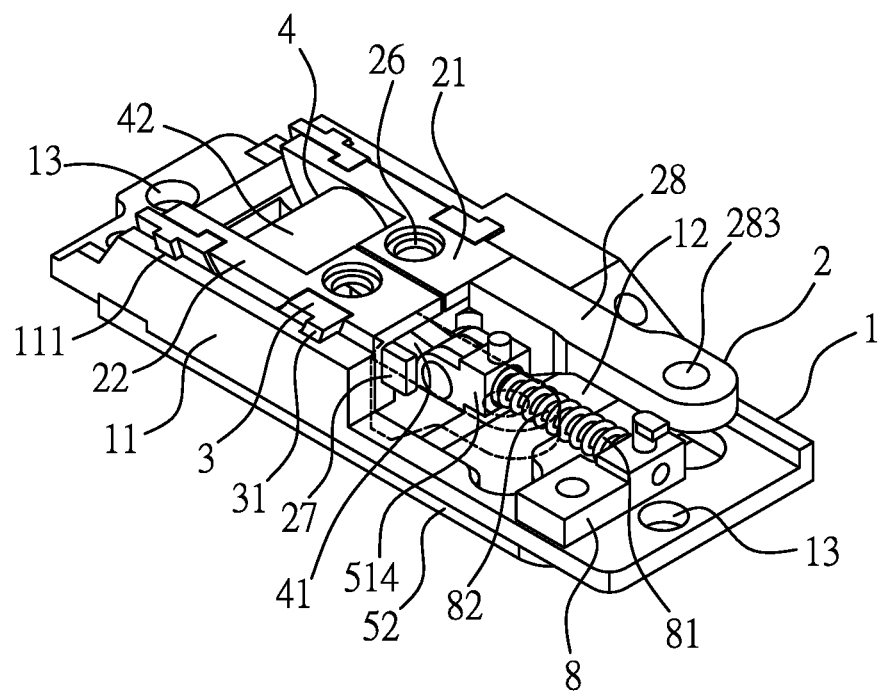
FIG. 11 is a perspective view illustrating the rotation shaft device shown in FIG. 10.
Figure 12:
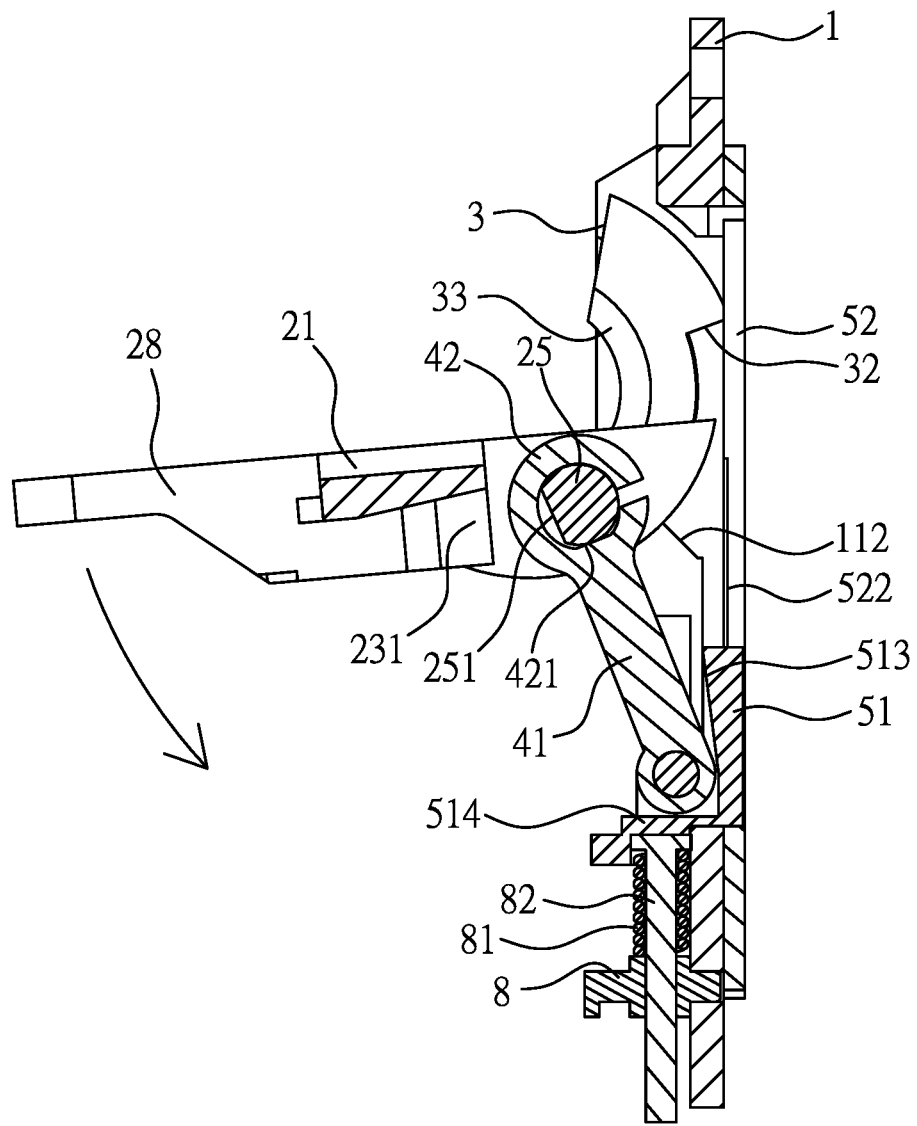
FIG. 12 is a cross sectional view illustrating the rotation shaft device shown in FIG. 10 being in an automatically folding status.

Referring from FIG. 10 to FIG. 12, which discloses a second embodiment of the rotation shaft device provided by the present invention, the same codes adapted in the first embodiment are defined as the same components disclosed in the second embodiment, because many components are shared in both of the second embodiment and the first embodiment, only the differences between the above two are provided as followings.

According to the second embodiment, a top surface of the base 1 further includes the auxiliary member 8, the auxiliary member 8 is disposed at an opposite side of the engage member 514 of the slide block 51, the engage member 514 is arranged to be adjacent to the pivotal part 511, and a guide rod 82 is respectively connected to the engage member 514 and the auxiliary member 8, and the compression spring 81 is sleeved thereon, the auxiliary member 8 is served to allow the guide rod 82 to be disposed, so that the compression spring 81 is able to radially slide with the slide block 51 for forming an energy storing or an energy releasing function. The assembly of the rotation shaft device, the auxiliary member 8 and the engage member 514 is as shown in FIG. 11 (a part of the connection member 28 is shown in dash lines for the purpose of clear illustration).

According to the second embodiment, the staged torsion adjusting function can be served to counteract the friction torsion respectively in the later unfolding stage and the later folding stage, thereby forming a laborsaving effect, and can be served to counteract the forces applied during the operations and the weight of the object, thereby forming a supporting effect. For instance, when being in the early unfolding stage, for example from 0 to 85 degrees, the slide block 51 is pivotally connected to the torsion unit 4 and the first rotation unit 2 for sliding downwardly and radially to the bottom distal end of the slide slot 522, so that the compression spring 81 is able to store energy for assisting the friction torsion mechanism to counteract the forces applied during the operations and the weight of the tablet computer 6 (the weight of the object), thereby forming the above-mentioned supporting effect.

When being in the later unfolding stage, for example from 85 to 150 degrees, the compression spring 81 is served to release energy for providing an auxiliary elastic force to counteract the gradually-increased friction torsion generated by the friction torsion mechanism, so that the slide block 51 and the torsion unit 4 can both slide upwardly and radially for easily reaching the maximum unfolding angle, and the laborsaving effect is provided.

On the other hand, when being in the early folding stage, for example from 150 to 85 degrees, the slide block 51 is recovered for sliding downwardly and radially through being pivotally connected to the reversely-operated torsion unit 4 and the first rotation unit 2, so that the compression spring 81 is able to store energy again for assisting the friction torsion mechanism having the friction torsion being gradually reduced to counteract the forces applied during the operations and the weight of the tablet computer 6, thereby forming the above-mentioned supporting effect.

When being in the later folding stage, the rotation shaft device not only provides the above-mentioned laborsaving effect, an automatically folding effect is also provided. As shown in FIG. 12, when the folding process is processed to the second preset angle, for example 85 degrees, because the friction torsion is weakened and the energy is released by the compression spring 8 for providing an auxiliary elastic force, so that the slide block 51 and the torsion unit 4 can both slide upwardly and radially, thereby facilitating the folding operation, when the folding angle reaches the first preset angle, for example 35 degrees or less than 35 degrees, the friction torsion is no longer sufficient thereby forming the automatically folding and laborsaving effect.

Figure 13:
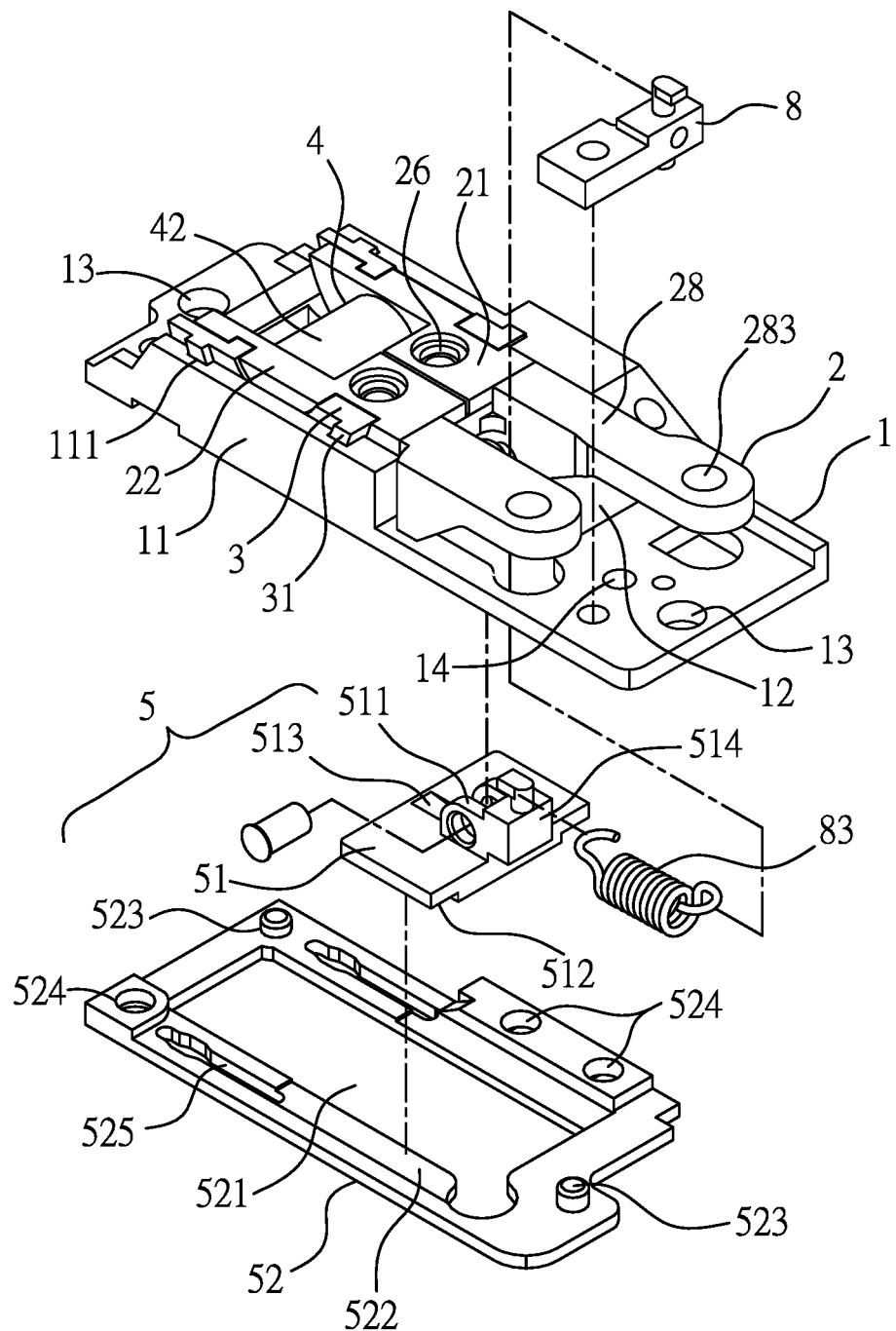
FIG. 13 is a perspective exploded view illustrating the rotation shaft device according a third embodiment of the present invention.
Figure 14:
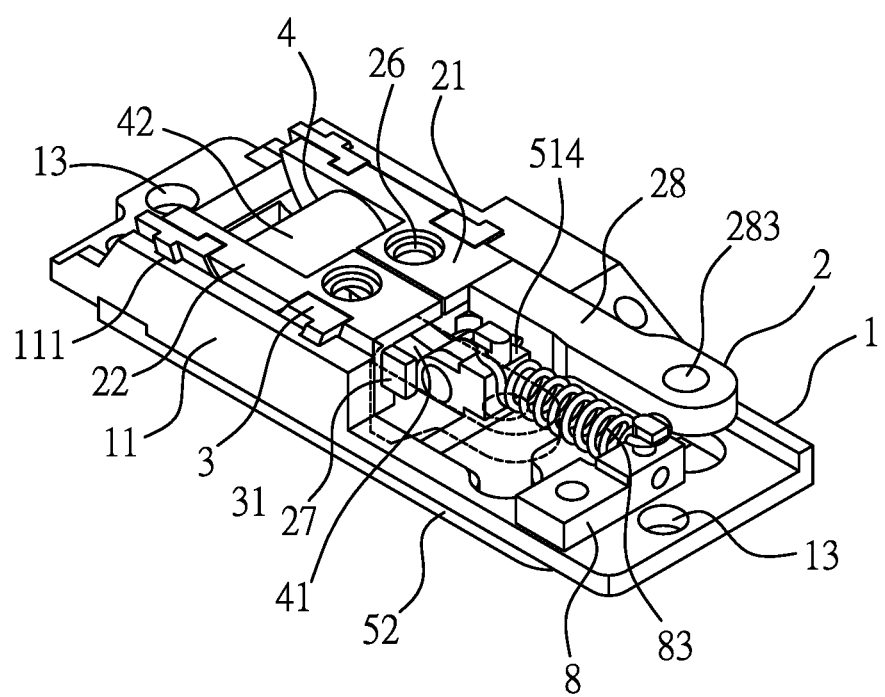
FIG. 14 is a perspective view illustrating the rotation shaft device shown in FIG. 13.
Figure 15:
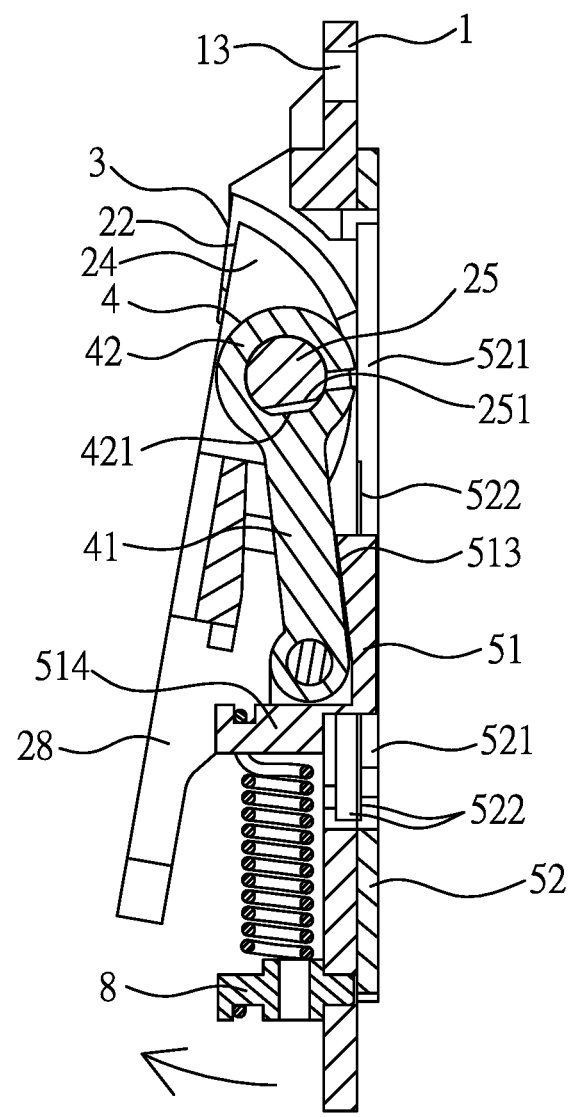
FIG. 15 is a cross sectional view illustrating the rotation shaft device shown in FIG. 13 being in an automatically unfolding status.

Referring to FIG. 13 to FIG. 15, which discloses a third embodiment of the rotation shaft device provided by the present invention; the same codes adapted in the second embodiment are defined as the same components disclosed in the third embodiment, because many components are shared in both of the third embodiment and the second embodiment, only the differences between the above two are provided as followings.

The tension sprig 83 (as known as a pull spring or a pulling force spring) is disposed between the engage member 514 and the auxiliary member 8, the tension spring 83 can radially slide with the slide block 51, thereby forming an energy storing or an energy releasing function. The assembly of the rotation shaft device, the auxiliary member 8 and the engage member 514 is as shown in FIG. 14 (a part of the connection member 28 is shown in dash lines for the purpose of clear illustration).

As such, according to the third embodiment, the staged torsion adjusting function is just opposite to the staged torsion adjusting function disclosed in the second embodiment, so that the friction torsion can be counteracted both in the early unfolding stage and the early folding stage, thereby forming a laborsaving effect; and the forces applied during the operations and the weight of the object can be counteracted in the later unfolding stage and the later folding stage, thereby forming a supporting effect. For instance, when being in the early unfolding stage, for example from 0 to 85 degrees, and before the unfolding operation being processed, for example at zero degree, because the tension spring 83 is stretched for being in an energy storing status, when the unfolding angle is greater than zero degree, because the friction torsion is overly small and the pair of moveable magnets 61 disposed in the tablet computer 6 are yet fully attracted to the pair of fixed magnets 71 disposed in the supporter 7, the magnetic attraction force between the above-mentioned magnets is gradually reduced than becomes smaller than an auxiliary elastic force provided by the tension spring 83, and the slide block 51 downwardly and radially slides through being pivotally connected to the torsion unit 4 and the first rotation unit 2, so that a preset angle is automatically formed, for example 10 to 35 degrees, thereby achieving the laborsaving effect and having an automatically unfolding effect.

Before being further unfolded to the second preset angle, for example 85 degrees, because the friction torsion is gradually increased, the laborsaving effect is gradually reduced; when being in the later unfolding stage, for example from 85 to 150 degrees, the slide block 51 upwardly and radially slides through being pivotally connected to the first rotation unit 2 and the torsion unit 4, and the tension spring 83 is stretched again for storing energy, and the friction torsion is gradually increased by the friction torsion mechanism to counteract the forces applied during the operations and the weight of the tablet computer 6, thereby forming the above-mentioned supporting effect.

On the other hand, when being in the early folding stage, for example from 150 to 85 degrees, the friction torsion is gradually reduced, the slide block 51 can be easily recovered to downwardly and radially slide to the bottom distal end through being pivotally connected to the reversely-operated torsion unit 4 and the first rotation unit 2 and an auxiliary elastic force provide by the tension spring 83.

When being in the later folding stage, for example below 85 degrees, the tension spring 83 is stretched for storing energy so as to assist the friction torsion mechanism having the friction torsion being gradually reduced, thus the forces applied during the operations and the weight of the tablet computer 6 can be counteract, thereby forming the above-mentioned supporting effect, until the pair of fixed magnets 71 disposed in the supporter 7 are close to the pair of moveable magnets 61 disposed in the tablet computer 6, at this moment, because the friction torsion is overly small and the magnetic attraction force is greater than the energy-storing elastic force of the tension spring 83, the supporter 7 is therefore folded and engaged with the tablet computer 6.

Based on what has been disclosed above, advantages achieved by the present invention are as followings: the slide block of the slide mechanism can be stably and radially slid and displaced between the bottom seat and the base during the two motions of unfolding and folding, and the friction torsion mechanism respectively allows the friction torsion to be gradually increased from zero and gradually decreased to zero friction torsion during the normal and the reverse rotation processes for generating the unfolding and folding effect; moreover, with the slide block being thinned, the thickness of the rotation shaft device can be reduced, so that the rotation shaft device would not increase the whole thickness of a flat electronic device, for example a tablet computer or an all-in-one (AIO) computer and the structural strength can be remained; furthermore, the rotation shaft device can further includes the auxiliary member and the relevant elastic component for enabling the torsion to be adjusted in stages, thus during the process of unfolding or folding, the supporting effect can be served to counteract the forces applied during the operations and the weight of the object, the laborsaving effect can also be provided, and an automatically folding or an automatically unfolding effect can be provided by adopting different springs. Accordingly, the rotation shaft device provided by the present invention is novel and more practical in use comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A rotation shaft device, comprising:
   a base, having a hollow slot formed between a pair of lateral walls thereof;
   a first rotation unit, disposed between said pair of lateral walls, wherein said first rotation unit is formed with a pair of outer walls and a pair of inner walls;
   a pair of second rotation units, sharing a common rotation center with said first rotation unit, wherein a first rotation guiding structure is disposed between each of said pair of second rotation units and each of said pair of lateral walls, and a second rotation guiding structure is disposed between each of said pair of second rotation units and each of said pair of outer walls;
   a torsion unit, having a connection rod, wherein a friction torsion mechanism is disposed between one end of said connection rod and said pair of inner walls; and
   a slide mechanism, including a slide block disposed in said hollow slot, wherein a top surface of said slide block is formed with a pivotal part pivoted with said connection rod, and a pair of slide pieces are disposed at two opposite sides of said slide bock; and a bottom seat, disposed at a bottom end of said base and formed with an accommodation part communicated with said hollow slot, wherein two opposite sides defined on a top surface of said accommodation part and/or a bottom surface of said base are formed with a pair of slide slots allowing said pair of slide pieces to be disposed thereon; said slide block is pivotally connected to said torsion unit and said first rotation unit, so that said pair of slide pieces are able to stably slide between said bottom surface of said base and said pair of slide slots.

2. The rotation shaft device as claimed in claim 1, wherein said pivotal part is formed with a recessed slot on said top surface of said slide block and served to allow a part of said connection rod to be accommodated.

3. The rotation shaft device as claimed in claim 1, wherein said first rotation guiding structure is formed with a first arc-shaped guiding slot and a first arc-shaped guiding rail oppositely arranged between one of said pair of second rotation units and one of said pair of lateral walls, thereby enabling said first arc-shaped guiding rail to be rotated along said first arc-shaped guiding slot; and said second rotation guiding structure is formed with a second arc-shaped guiding slot and a second arc-shaped guiding rail oppositely arranged between one of said pair of second rotation units and one of said pair of outer walls, thereby enabling said second arc-shaped guiding slot to be rotated along said second arc-shaped guiding rail.

4. The rotation shaft device as claimed in claim 3, wherein a circumference of said first arc-shaped guiding slot is communicated with a first position limiting block, and each of said pair of second rotation units is correspondingly disposed with a first position limiting protrusion capable of being abutted against said first position limiting block; a circumference of said second arc-shaped guiding slot is communicated with a second position limiting block, and each of said pair of second rotation units is correspondingly disposed with a second position limiting protrusion capable of being abutted against said second position limiting block; and said bottom seat is respectively formed with an elongated slit corresponding to each of said pair of second rotation units, each of said elongated slits is served to allow each of said first position limiting protrusions to enter and pass, thereby enabling each of said pair of second rotation units in a rotating status to be parallel with each other.

5. The rotation shaft device as claimed in claim 1, wherein said friction torsion mechanism includes a core shaft disposed between said pair of inner walls of said first rotation unit, and said connection rod is axially disposed with a C-shaped covering member sleeved on said core shaft.

6. The rotation shaft device as claimed in claim 5, wherein an inner wall of said C-shaped covering member is formed with at least one oil groove.

7. A rotation shaft device, comprising:
   a base, having a hollow slot formed between a pair of lateral walls thereof;
   a first rotation unit, disposed between said pair of lateral walls, wherein said first rotation unit is formed with a pair of outer walls and a pair of inner walls;
   a pair of second rotation units, sharing a common rotation center with said first rotation unit, wherein a first rotation guiding structure is disposed between each of said pair of second rotation units and each of said pair of lateral walls, and a second rotation guiding structure is disposed between each of said pair of second rotation units and each of said pair of outer walls;
   a torsion unit, having a connection rod, wherein a friction torsion mechanism is disposed between one end of said connection rod and said pair of inner walls; and
   a slide mechanism, including a slide block disposed in said hollow slot, wherein a top surface of said slide block is formed with a pivotal part pivoted with said connection rod and an engage member, and a pair of slide pieces are disposed at two opposite sides of said slide bock; and a bottom seat, disposed at a bottom end of said base and formed with an accommodation part communicated with said hollow slot, wherein two opposite sides defined on a top surface of said accommodation part and/or a bottom surface of said base are formed with a pair of slide slots allowing said pair of slide pieces to be disposed thereon; said slide block is pivotally connected to said torsion unit and said first rotation unit, so that said pair of slide pieces are able to stably slide between said bottom surface of said base and said pair of slide slots; and
   an auxiliary member, disposed on a top surface of said base and located at an opposite side of said engage member, a guide rod sleeved with a compression spring is disposed on said engage member and said auxiliary member, and said auxiliary member allows said guide rod to be disposed, so that said compression spring is able to slide with said slide block for forming an energy storing status or an energy releasing status.

8. The rotation shaft device as claimed in claim 7, wherein said pivotal part is formed with a recessed slot on said top surface of said slide block and served to allow a part of said connection rod to be accommodated.

9. The rotation shaft device as claimed in claim 7, wherein said first rotation guiding structure is formed with a first arc-shaped guiding slot and a first arc-shaped guiding rail oppositely arranged between one of said pair of second rotation units and one of said pair of lateral walls, thereby enabling said first arc-shaped guiding rail to be rotated along said first arc-shaped guiding slot; and said second rotation guiding structure is formed with a second arc-shaped guiding slot and a second arc-shaped guiding rail oppositely arranged between one of said pair of second rotation units and one of said pair of outer walls, thereby enabling said second arc-shaped guiding slot to be rotated along said second arc-shaped guiding rail.

10. The rotation shaft device as claimed in claim 9, wherein a circumference of said first arc-shaped guiding slot is communicated with a first position limiting block, and each of said pair of second rotation units is correspondingly disposed with a first position limiting protrusion capable of being abutted against said first position limiting block; a circumference of said second arc-shaped guiding slot is communicated with a second position limiting block, and each of said pair of second rotation units is correspondingly disposed with a second position limiting protrusion capable of being abutted against said second position limiting block; and said bottom seat is respectively formed with an elongated slit corresponding to each of said pair of second rotation units, each of said elongated slits is served to allow each of said first position limiting protrusions to enter and pass, thereby enabling each of said pair of second rotation units in a rotating status to be parallel with each other.

11. The rotation shaft device as claimed in claim 7, wherein said friction torsion mechanism includes a core shaft disposed between said pair of inner walls of said first rotation unit, and said connection rod is axially disposed with a C-shaped covering member sleeved on said core shaft.

12. The rotation shaft device as claimed in claim 11, wherein an inner wall of said C-shaped covering member is formed with at least one oil groove.

13. A rotation shaft device, comprising:
a base, having a hollow slot formed between a pair of lateral walls thereof;
a first rotation unit, disposed between said pair of lateral walls, wherein said first rotation unit is formed with a pair of outer walls and a pair of inner walls;
a pair of second rotation units, sharing a common rotation center with said first rotation unit, wherein a first rotation guiding structure is disposed between each of said pair of second rotation units and each of said pair of lateral walls, and a second rotation guiding structure is disposed between each of said pair of second rotation units and each of said pair of outer walls;
a torsion unit, having a connection rod, wherein a friction torsion mechanism is disposed between one end of said connection rod and said pair of inner walls; and
a slide mechanism, including a slide block disposed in said hollow slot, wherein a top surface of said slide block is formed with a pivotal part pivoted with said connection rod and an engage member, and a pair of slide pieces are disposed at two opposite sides of said slide bock; and a bottom seat, disposed at a bottom end of said base and formed with an accommodation part communicated with said hollow slot, wherein two opposite sides defined on a top surface of said accommodation part and/or a bottom surface of said base are formed with a pair of slide slots allowing said pair of slide pieces to be disposed thereon; said slide block is pivotally connected to said torsion unit and said first rotation unit, so that said pair of slide pieces are able to stably slide between said bottom surface of said base and said pair of slide slots; and
an auxiliary member, disposed on a top surface of said base and located at an opposite side of said engage member, a tension spring is disposed on said engage member and said auxiliary member, and said tension spring is able to slide with said slide block for forming an energy storing status or an energy releasing status.

14. The rotation shaft device as claimed in claim 13, wherein said pivotal part is formed with a recessed slot on said top surface of said slide block and served to allow a part of said connection rod to be accommodated.

15. The rotation shaft device as claimed in claim 13, wherein said first rotation guiding structure is formed with a first arc-shaped guiding slot and a first arc-shaped guiding rail oppositely arranged between one of said pair of second rotation units and one of said pair of lateral walls, thereby enabling said first arc-shaped guiding rail to be rotated along said first arc-shaped guiding slot; and said second rotation guiding structure is formed with a second arc-shaped guiding slot and a second arc-shaped guiding rail oppositely arranged between one of said pair of second rotation units and one of said pair of outer walls, thereby enabling said second arc-shaped guiding slot to be rotated along said second arc-shaped guiding rail.

16. The rotation shaft device as claimed in claim 15, wherein a circumference of said first arc-shaped guiding slot is communicated with a first position limiting block, and each of said pair of second rotation units is correspondingly disposed with a first position limiting protrusion capable of being abutted against said first position limiting block; a circumference of said second arc-shaped guiding slot is communicated with a second position limiting block, and each of said pair of second rotation units is correspondingly disposed with a second position limiting protrusion capable of being abutted against said second position limiting block; and said bottom seat is respectively formed with an elongated slit corresponding to each of said pair of second rotation units, each of said elongated slits is served to allow each of said first position limiting protrusions to enter and pass, thereby enabling each of said pair of second rotation units in a rotating status to be parallel with each other.

17. The rotation shaft device as claimed in claim 13, wherein said friction torsion mechanism includes a core shaft disposed between said pair of inner walls of said first rotation unit, and said connection rod is axially disposed with a C-shaped covering member sleeved on said core shaft.

18. The rotation shaft device as claimed in claim 17, wherein an inner wall of said C-shaped covering member is formed with at least one oil groove.

* * * * *